US012648588B2

(12) United States Patent
Lee

(10) Patent No.: US 12,648,588 B2
(45) Date of Patent: Jun. 9, 2026

(54) AEROSOL GENERATING ARTICLE AND METHOD OF MANUFACTURING THE SAME

(71) Applicant: KT&G CORPORATION, Daejeon (KR)

(72) Inventor: Moon Bong Lee, Seoul (KR)

(73) Assignee: KT&G CORPORATION, Daejeon (KR)

( * ) Notice: Subject to any disclaimer, the term of this patent is extended or adjusted under 35 U.S.C. 154(b) by 622 days.

(21) Appl. No.: 17/911,014

(22) PCT Filed: Feb. 18, 2022

(86) PCT No.: PCT/KR2022/002405
§ 371 (c)(1),
(2) Date: Sep. 12, 2022

(87) PCT Pub. No.: WO2022/177340
PCT Pub. Date: Aug. 25, 2022

(65) Prior Publication Data

US 2023/0157349 A1 May 25, 2023

(30) Foreign Application Priority Data

Feb. 22, 2021 (KR) ........................ 10-2021-0023697
Feb. 17, 2022 (KR) ........................ 10-2022-0020832

(51) Int. Cl.
*A24D 3/17* (2020.01)
*A24C 5/01* (2020.01)
(Continued)

(52) U.S. Cl.
CPC .................. *A24C 5/01* (2020.01); *A24C 5/18* (2013.01); *A24D 1/02* (2013.01); *A24D 1/045* (2013.01);
(Continued)

(58) Field of Classification Search
None
See application file for complete search history.

(56) References Cited

U.S. PATENT DOCUMENTS 10,952,469 B2 * 3/2021 Mironov ................ H05B 6/108
11,317,648 B2 5/2022 Mironov et al.
(Continued)

FOREIGN PATENT DOCUMENTS

CN 113795158 A 12/2021
JP 2016-538848 A 12/2016
(Continued)

OTHER PUBLICATIONS

International Search Report of PCT/KR2022/002405 dated May 31, 2022 [PCT/ISA/210].
(Continued)

*Primary Examiner* — Michael H. Wilson
*Assistant Examiner* — Michael T Fulton
(74) *Attorney, Agent, or Firm* — Sughrue Mion, PLLC

(57) ABSTRACT

A method of manufacturing an aerosol generating article includes: providing a tobacco rod including a susceptor having a form in which a plurality of strands are twisted together; providing a filter rod arranged at one end of the tobacco rod; and wrapping the tobacco rod and the filter rod with a wrapper.

8 Claims, 13 Drawing Sheets

(51) Int. Cl.

| | |
|---|---|
| ***A24C 5/18*** | (2006.01) |
| ***A24D 1/02*** | (2006.01) |
| ***A24D 1/04*** | (2006.01) |
| ***A24D 1/20*** | (2020.01) |
| ***H05B 6/10*** | (2006.01) |

(52) U.S. Cl.

CPC ................. *A24D 1/20* (2020.01); *A24D 3/17* (2020.01); *H05B 6/105* (2013.01)

(56) References Cited

U.S. PATENT DOCUMENTS

| | | | | |
|---|---|---|---|---|
| 2015/0096578 | A1* | 4/2015 | O'Donovan ............. | A24C 5/40 131/345 |
| 2016/0150825 | A1 | 6/2016 | Mironov et al. | |
| 2016/0331032 | A1 | 11/2016 | Malgat et al. | |
| 2018/0279681 | A1 | 10/2018 | Rojo-Calderon et al. | |
| 2018/0310607 | A1* | 11/2018 | Prestia ..................... | A24B 3/14 |
| 2019/0208813 | A1 | 7/2019 | Rojo-Calderon et al. | |
| 2019/0313701 | A1 | 10/2019 | Cadieux et al. | |
| 2020/0236994 | A1 | 7/2020 | Blandino et al. | |
| 2021/0030068 | A1 | 2/2021 | Mironov et al. | |
| 2022/0175021 | A1 | 6/2022 | Austin et al. | |
| 2022/0183348 | A1 | 6/2022 | Selby et al. | |

FOREIGN PATENT DOCUMENTS

| | | | | |
|---|---|---|---|---|
| JP | 2017-519493 A | 7/2017 | | |
| JP | 2018-515114 A | 6/2018 | | |
| JP | 2018-537960 A | 12/2018 | | |
| KR | 10-2017-0008730 A | 1/2017 | | |
| KR | 10-2018-0036764 A | 4/2018 | | |
| KR | 10-2018-0071323 A | 6/2018 | | |
| WO | 2019/157177 A1 | 8/2019 | | |
| WO | WO-2020064682 A1 * | 4/2020 | ............... | A24D 1/02 |
| WO | 2020/181358 A1 | 9/2020 | | |

OTHER PUBLICATIONS

Extended Eurpoean Search Report dated Nov. 7, 2023 in Application No. 22756538.9.

Japanese Office Action dated Sep. 19, 2023 in Application No. 2022-547803.

Chinese Office Action dated Jun. 29, 2024 in Application No. 202280002951.5.

* cited by examiner

AEROSOL GENERATING ARTICLE AND METHOD OF MANUFACTURING THE SAME

CROSS REFERENCE TO RELATED APPLICATIONS

This application is a National Stage of International Application No. PCT/KR2022/002405, filed Feb. 18, 2022, claiming priorities to Korean Patent Application No. 10-2021-0023697, filed Feb. 22, 2021 and Korean Patent Application No. 10-2022-0020832, filed Feb. 17, 2022.

TECHNICAL FIELD

The present disclosure relates to an aerosol generating article and a method of manufacturing the aerosol generating article, and more particularly, to an aerosol generating article in which ease of cutting and heat-generating efficiency of a susceptor material may be improved, and a method of manufacturing the aerosol generating article.

BACKGROUND ART

Recently, there is an increasing demand for alternative methods of coping with the shortcomings of general cigarettes. For example, there is an increasing demand for a method of generating aerosols by heating an aerosol generating material in cigarettes or liquid storages rather than generating aerosols by burning cigarettes.

There have been proposed heating methods different from a method of arranging a heater, which is formed of an electrically resistant material, inside or outside of a cigarette accommodated in an aerosol generating device and heating the cigarette by providing power to the heater. Particularly, research on methods of heating cigarettes by an induction heating method has been actively conducted.

In such an induction heating method, a susceptor is heated via an induction coil. However, as susceptors in the related art are formed of a single object having the same volume, there are problems in that the susceptor is not easy to process (for example, cut) and has lower heat-generating efficiency.

DESCRIPTION OF EMBODIMENTS

Technical Problem

The present disclosure is to provide an aerosol generating article, by which ease of manufacturing a susceptor material and heat-generating efficiency may be improved, and a method of manufacturing the aerosol generating article.

The technical problem of the present disclosure is not limited thereto, and other technical problems may also be derived from examples described below.

Solution to Problem

A method of manufacturing an aerosol generating article includes providing a tobacco rod including a susceptor having a form in which a plurality of strands are twisted together, providing a filter rod arranged at an end of the tobacco rod, and wrapping the tobacco rod and the filter rod with a wrapper.

Advantageous Effects of Disclosure

According to the method of manufacturing the aerosol generating article of the present disclosure, a susceptor is manufactured in a twisted form, the susceptor may be easily cut.

According to the method of manufacturing the aerosol generating article of the present disclosure, a susceptor in a twisted form is surrounded with a tobacco material, the tobacco material is processed into a cylindrical object, and the susceptor is cut together with the tobacco material. Thus, production rate may be significantly improved, and mass production is facilitated.

In addition, according to the method of manufacturing the aerosol generating article of the present disclosure, the susceptor manufactured in the twisted form is impregnated with the aerosol generating material, and therefore an increase in a heat-generating area leads to a significant increase in a heat-generating efficiency.

Advantages effects of the present disclosure are not limited to the aforementioned examples, and more various effects are included in the present specification.

BEST MODE

Figure 1:
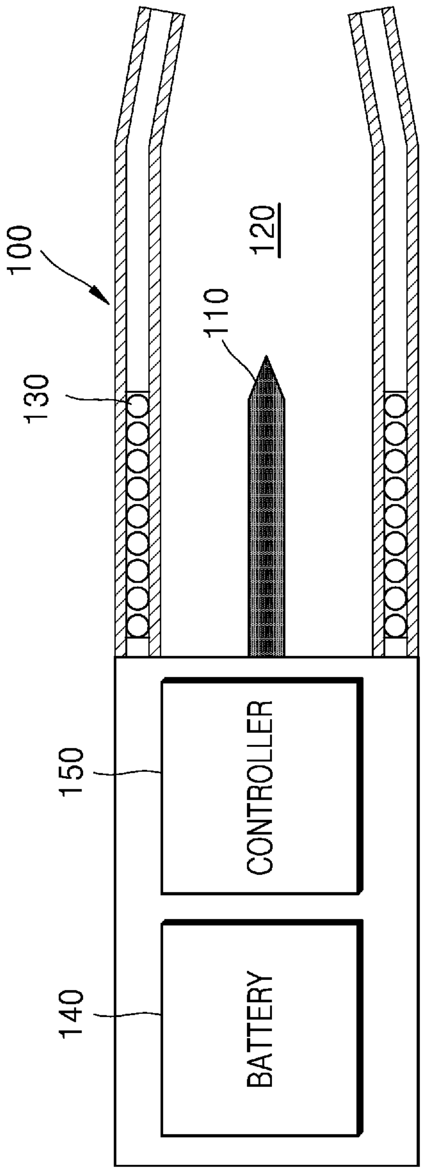
FIGS. 1 to 2 are diagrams of an aerosol generating device of an induction heating type.

A method of manufacturing an aerosol generating article includes: providing a tobacco rod including a susceptor having a form in which a plurality of strands are twisted together; providing a filter rod arranged at one end of the tobacco rod; and wrapping the tobacco rod and the filter rod with a wrapper.

In addition, the providing of the tobacco rod includes: providing a susceptor extending in a direction; surrounding the susceptor with a tobacco material and processing the tobacco material into a cylindrical shape; and cutting the cylindrical shape.

In addition, the providing of the susceptor includes: providing a plurality of wires having different lengths; forming the plurality of wires into a form twisted in a preset direction; and extending the form twisted in the preset direction by adding a new wire.

In addition, the plurality of wires have different diameters.

In addition, the providing the susceptor further includes impregnating the susceptor having the form which the plurality of strands are twisted, with an aerosol generating material.

In addition, the cutting the cylindrical shape includes removing a portion in which a preset number or more of wires are twisted together.

In addition, the providing the filter rod includes: providing a cooling segment configured to cool an aerosol; and providing a filter segment arranged at an end of the cooling segment and configured to filter certain materials included in the aerosol.

In addition, the providing the cooling segment includes: providing a first cooling member configured to allow the aerosol pass therethrough and having a first diameter; and providing a second cooling member having a second diameter different from the first diameter.

In addition, before the providing of the tobacco rod, the method of manufacturing the aerosol generating article further includes providing a front-end plug arranged at another end of the tobacco rod.

The wrapping with the wrapper includes forming a perforation in a region of the wrapper surrounding at least one of the tobacco rod and the filter rod.

According to another aspect, the aerosol generating article includes: a tobacco rod including a susceptor formed into a form in which a plurality of strands are twisted together; a filter rod arranged at an end of the tobacco rod; and a wrapper wrapped around the tobacco rod and the filter rod.

Mode of Disclosure

With respect to the terms used to describe the various embodiments, general terms which are currently and widely used are selected in consideration of functions of structural elements in the various embodiments of the present disclosure. However, meanings of the terms may be changed according to intention, a judicial precedence, the appearance of new technology, and the like. Also, specified terms may be selected by the applicant, and in this case, the detailed meaning thereof will be described in detailed description of the disclosure. Thus, the terms used in the present disclosure should not be understood as simple names, but should be understood based on the meaning of the terms and the overall descriptions of the present disclosure.

Throughout the specification, when a portion "includes" an element, another element may be further included, rather than excluding the existence of the other element, unless otherwise described. In addition, the terms "unit," "module," and the like described in the specification indicate units for processing at least one function or operation and may be implemented by hardware components or software components or combinations thereof.

Hereinafter, the present disclosure will be described more fully with reference to the accompanying drawings, in which embodiments of the present disclosure are shown such that one of ordinary skill in the art may easily understand the present disclosure. However, the present disclosure may be embodied in various types and is not limited to the embodiments described herein.

Hereinafter, embodiments of the disclosure will be described in detail with reference to the accompanying drawings.

Figure 2:
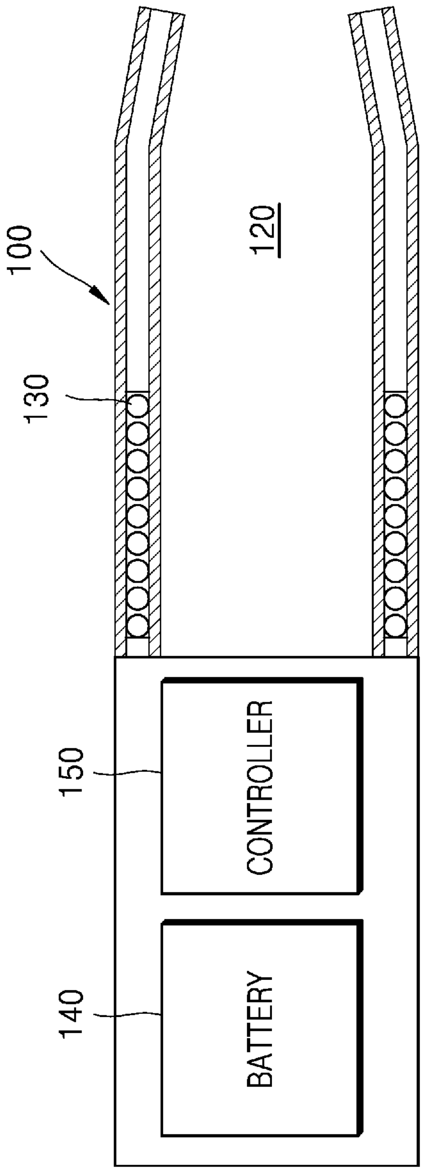

FIGS. 1 to 2 are diagrams of an aerosol generating device of an induction heating type.

Referring to FIG. 1, an aerosol generating device 100 may include a susceptor 110, an accommodating space 120, a coil portion 130, a battery 140, and a controller 150. According to embodiments, the susceptor 110 may be included in a cigarette 200 (see FIGS. 3 to 4). In this case, as shown in FIG. 2, the aerosol generating device 100 may not include the susceptor 110.

The aerosol generating device 100 shown in FIGS. 1 to 2 includes components related to the present embodiment. Accordingly, those skilled in the related art may understand that other general-purpose components, in addition to the components shown in FIGS. 1 to 2, may be further included in the aerosol generating device 100.

The aerosol generating device 100 may generate an aerosol by heating the cigarette 200, which is accommodated in the aerosol generating device 100, in an induction heating method. The induction heating method may indicate a method of generating heat from a magnetic substance by applying an alternating magnetic field, direction of which periodically changes, to the magnetic substance that generates heat due to an external magnetic field.

When the alternating magnetic field is applied to the magnetic substance, an energy loss due to an eddy current loss and hysteresis loss may occur to the magnetic field, and the lost energy may be emitted as heat energy from the magnetic substance. As the alternating magnetic field applied to the magnetic substance has a greater amplitude or frequency, a greater amount of heat energy may be emitted from the magnetic substance. The aerosol generating device 100 may have the magnetic substance emit the heat energy by applying the alternating magnetic field to the magnetic substance, and may deliver the heat energy, which is emitted from the magnetic substance, to the cigarette 200.

The magnetic substance generating heat due to the external magnetic field may include the susceptor 110. The susceptor 110 may be in the form of a piece, flake, or strip.

The susceptor 110 may include a metal or carbon. The susceptor 110 may include at least one of ferrite, a ferromagnetic alloy, stainless steel, and aluminum (Al). In addition, the susceptor 110 may include at least one of graphite, molybdenum, silicon carbide, niobium, nickel alloy, a metal film, ceramic such as zirconia, a transition metal such as nickel (Ni) or cobalt (Co), or a metalloid such as boron (B) or phosphorus (P).

The aerosol generating device 100 may include the accommodating space 120 for accommodating the cigarette 200. The accommodating space 120 may include an opening that is open from outside of the accommodating space 120 to accommodate the cigarette 200 in the aerosol generating device 100. Through the opening of the accommodating space 120, the cigarette 200 may be accommodated in the aerosol generating device 100 in a direction from the outside of the accommodating space 120 to inside of the accommodating space 120.

As shown in FIG. 1, the susceptor 110 may be arranged at an inner end portion of the accommodating space 120. The susceptor 110 may be attached to a bottom surface formed at the inner end portion of the accommodating space 120. The cigarette 200 may be inserted into the susceptor 110 from top of the susceptor 110 and accommodated to the bottom surface of the accommodating space 120.

Alternatively, as shown in FIG. 2, the aerosol generating device 100 may not include the susceptor 110. In this case, the susceptor 110 may be included in the cigarette 200.

The aerosol generating device 100 may include a coil portion 130 configured to apply an alternating magnetic field to the susceptor 110 and induce magnetism in the susceptor 110. The coil portion 130 may include at least one coil.

The coil may be implemented as a solenoid. The coil may include a solenoid wound along a side of the accommodating space 120, and the cigarette 200 may be accommodated in an inner space of the solenoid. A material of a wiring included in the solenoid may include copper (Cu). However, the embodiment is not limited thereto, and as a material having a low resistivity and allowing a high current to flow therethrough, an alloy including any one or at least one of silver (Ag), gold (Au), aluminum (Al), tungsten (W), zinc (Zn), and nickel (N) may be the material of the wiring included in the solenoid.

The battery 140 may provide power to the coil portion 130. The battery 140 may include, but is not limited to, a lithium-iron phosphate ($LiFePO_4$) battery. For example, the battery may include a lithium cobalt oxide ($LiCoO_2$) battery, lithium titanate battery, and the like.

The controller 150 may control the power provided to the coil portion 130. When the coil portion 130 includes a plurality of coils, the controller 150 may change an amplitude, a frequency, and the like of an alternating current provided to the plurality of coils. In addition, the controller 150 may change a magnitude and the like of a direct current provided to the plurality of coils.

The controller 150 may perform induction heating on the susceptor 110 by controlling the amplitude, frequency and the like of the alternating current. In addition, the controller 150 may induce magnetism to the susceptor 110 by controlling the magnitude and the like of the direct current. The controller 150 may sense a change in magnetism of the susceptor caused by induction heating, and may calculate a temperature of the susceptor 110 based on a result of the sensing.

Figure 3:
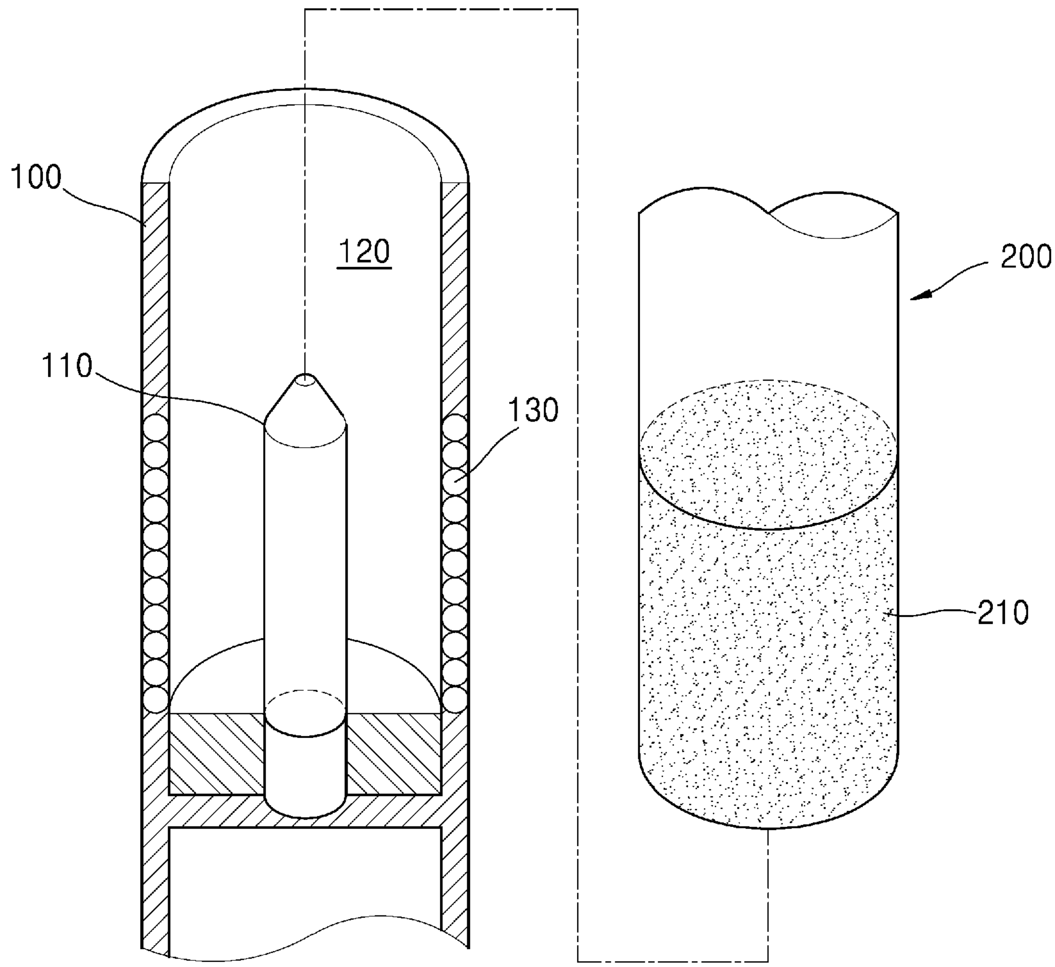
FIGS. 3 and 4 are diagrams of examples of a cigarette inserted into an aerosol generating device.
Figure 4:
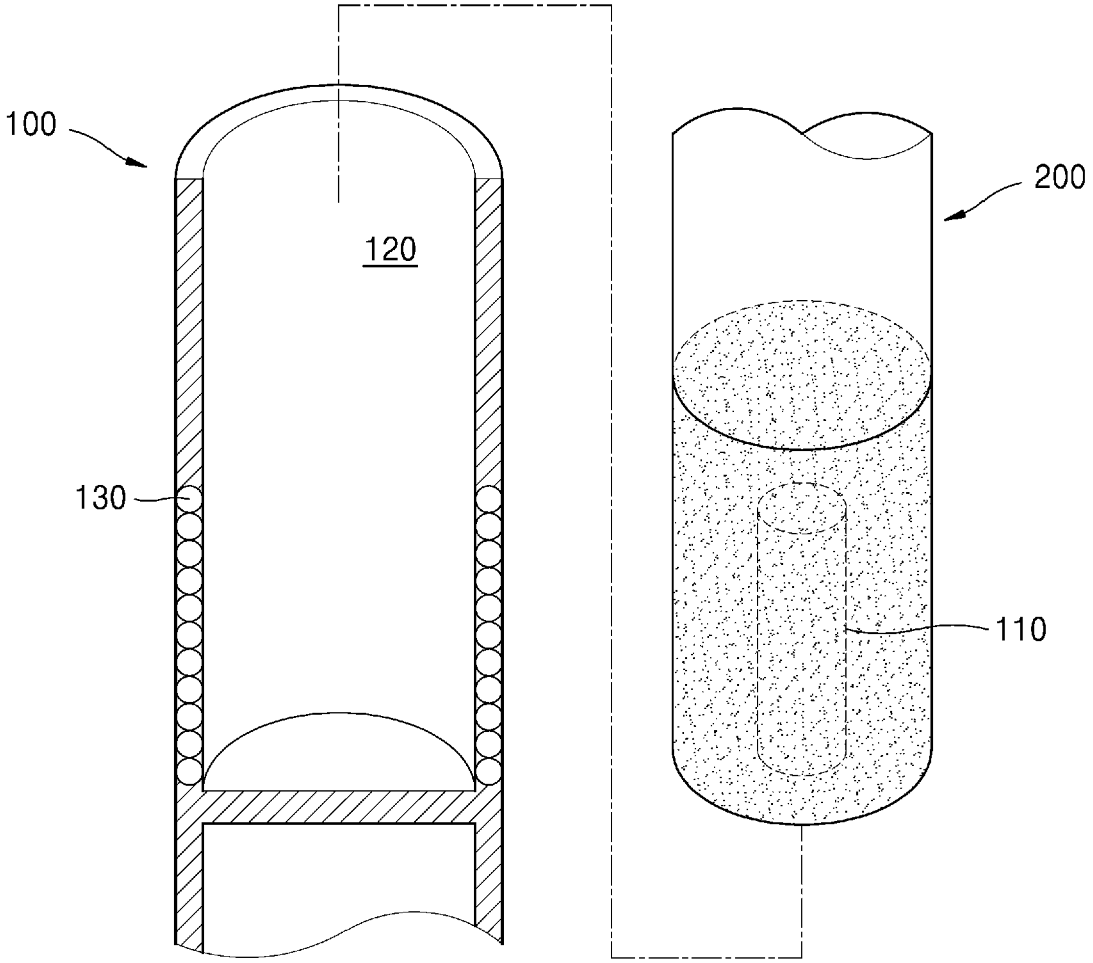

FIGS. 3 and 4 are diagrams of examples of the cigarette inserted into the aerosol generating device.

More particularly, FIG. 3 illustrates an example of the cigarette 200 inserted into the aerosol generating device 100 when the susceptor 110 is arranged in the aerosol generating device 100, and FIG. 4 illustrates an example of the cigarette 200 inserted into the aerosol generating device 100 when the susceptor 110 is arranged in the cigarette 200.

Referring to FIG. 3, the cigarette 200 may be accommodated in the accommodating space 120 in a longitudinal direction of the cigarette 200. The susceptor 110 may be inserted into the cigarette 200 that is accommodated in the aerosol generating device 100. As the susceptor 110 is inserted into the cigarette 200, a tobacco rod 210 may contact the susceptor 110. The susceptor 110 may have a structure extending in a longitudinal direction of the aerosol generating device 100 to be inserted into the cigarette 200.

The susceptor 110 may be in a center portion of the accommodating space 120 to be inserted into a center portion of the cigarette 200. Although FIG. 3 illustrates that there is only one susceptor 110, the embodiment is not limited thereto. In other words, the aerosol generating device 100 of the present disclosure may include a plurality of susceptors 110 extending in the longitudinal direction of the aerosol generating device 100 and arranged in parallel to one another to be inserted into the cigarette 200.

The coil portion 130 may include at least one coil, and the coil may be wound along an outer surface of the accommodating space 120 and extend in a longitudinal direction of the aerosol generating device 100. The coil extending in the longitudinal direction may be arranged at the outer surface of the accommodating space 120. The coil may extend in the longitudinal direction of the aerosol generating device 100 to a length corresponding to a length of the susceptor 110, and may be arranged at a position corresponding to a position of the susceptor 110.

Referring to FIG. 4, the cigarette 200 may be accommodated in the accommodating space 120 in a longitudinal direction of the cigarette 200. As the cigarette 200 is inserted into the accommodating space 120, the susceptor 110 may be surrounded by the coil portion 130.

To uniformly deliver the heat, the susceptor 110 may be in a center portion of the tobacco rod 210. Although FIG. 4 illustrates that there is only one susceptor 110, the embodiment is not limited thereto. In other words, the aerosol generating device 100 of the present disclosure may include a plurality of the susceptors 110 included in the cigarette 200.

As described below with reference to FIG. 5, the susceptor 110 shown in FIG. 4 may be manufactured in a twisted manner. According to embodiments, the susceptor 110 in FIG. 3 may also be manufactured in a twisted manner.

The coil portion 130 may include at least one coil, and the coil may be wound along an outer surface of the accommodating space 120 and extend in a longitudinal direction of the aerosol generating device 100. The coil extending in the longitudinal direction of the aerosol generating device 100 may be arranged at the outer surface of the accommodating space 120. The coil may extend in the longitudinal direction of the aerosol generating device 100 to a length corresponding to a length of the susceptor 110, and may be arranged at a position corresponding to a position of the susceptor 110.

Figure 5:
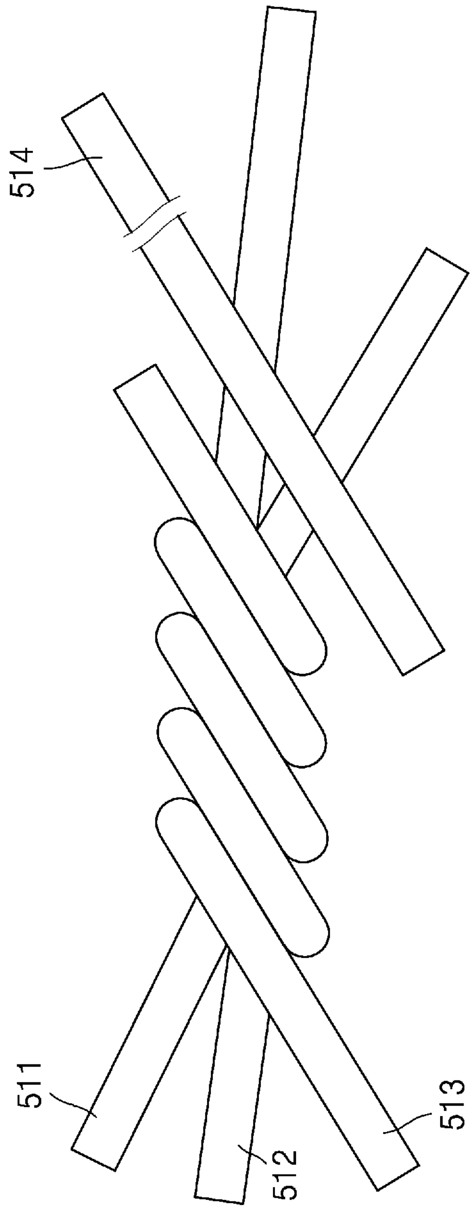
FIG. 5 is a diagram illustrating a method of manufacturing a susceptor included in the cigarette shown in FIG. 4.

FIG. 5 is a diagram illustrating a method of manufacturing the susceptor included in the cigarette shown in FIG. 4.

Referring to FIG. 5, the cigarette 200 may include the susceptor 110. The cigarette 200 may be referred to as an aerosol generating article.

The susceptor 110 may include a plurality of wires 511, 512, 513 The plurality of wires 511, 512, 513 may include at least one of ferrite, a ferromagnetic alloy, stainless steel, and aluminum (Al). In addition, the plurality of wires 511, 512, 513 may include at least one of graphite, molybdenum, silicon carbide, niobium, nickel alloy, a metal film, ceramic such as zirconia, a transition metal such as nickel (Ni) or cobalt (Co), and a metalloid such as boron (B) or phosphorus (P). Cross-sections of the plurality of wires 511, 512, 513 may be circular.

In an embodiment, the susceptor 110 may include three wires 511, 512, 513. Hereinafter, an example in which the susceptor 110 includes three wires, that is, the first wire 511, the second wire, 512, and the third wire 513, will be described, but the number of wires is not limited thereto.

The susceptor 110 may include the first wire 511, the second wire 512, and the third wire 513. The first wire 511, the second wire 512, and the third wire 513 may have different lengths, respectively. For example, the first wire 511 may have a first length, the second wire 512 may have a second length greater than the first length, and the third wire 513 may have a third length greater than the second length.

The susceptor 110 may be manufactured into a form in which the first wire 511, the second wire 512, and the third wire 513 are twisted together. In other words, the first wire 511, the second wire 512, and the third wire 513 may be twisted together. Accordingly, the first wire 511, the second wire, and the third wire 513 may extend with inclination with respect to the longitudinal direction. Here, the direction may indicate the longitudinal direction of the cigarette 200. As the susceptor 110 is manufactured in the twisted form, the susceptor 110 may be easily cut compared with a susceptor formed into a single body having the same volume, and a tensile strength of the susceptor 110 may be improved.

The first wire 511, the second wire 512, and the third wire 513 may be twisted in a preset direction. For example, the first wire 511, the second wire 512, and the third wire 513 may be twisted in a clockwise direction. As another example, the first wire 511, the second wire 512, and the third wire 513 may be twisted in a counter-clockwise direction.

The first wire 511, the second wire 512, and the third wire 513 may be formed twisted in the preset direction, and may extend in a direction. For example, the direction may indicate the longitudinal direction of the cigarette 200.

As the first wire 511, the second wire 512, and the third wire 513 respectively have different lengths, at a certain time point, one of the aforementioned wires is no more twisted with other two wires. In the method of the present disclosure, a new wire is added in consideration of the preset time point, and by doing so, the susceptor 110 may be extended.

More particularly, as the first wire 511 has a smallest length among the first wire 511, the second wire 512, and the third wire 513, and therefore, a new wire 514 may be provided at a time point from which the first wire 511 is no more twisted with the second wire 512 and the third wire 513. For example, the preset time point may be set based on a time point at which a length of a non-twisted portion is less than a reference length. The reference length may be 1 cm to 3 cm, but is not limited thereto.

The new wire 514 that has been provided may be twisted together with the second wire 512 and the third wire 513. Accordingly, the susceptor 110 may extend in a direction. A length of the new wire 514 may be set based on a length of the longest wire from among the plurality of wires 511, 512, 513. For example, the length of the new wire 514 may be set greater than the length of the third wire 513.

As the first wire 511, the second wire 512, and the third wire 513 are provided in different lengths, lengths of new wires 514 to be added thereafter may have the same length. In other words, as the susceptor 110 of the present disclosure may be manufactured in an unlimited continuous supply method, the producing rate may be significantly increased.

Figure 6:
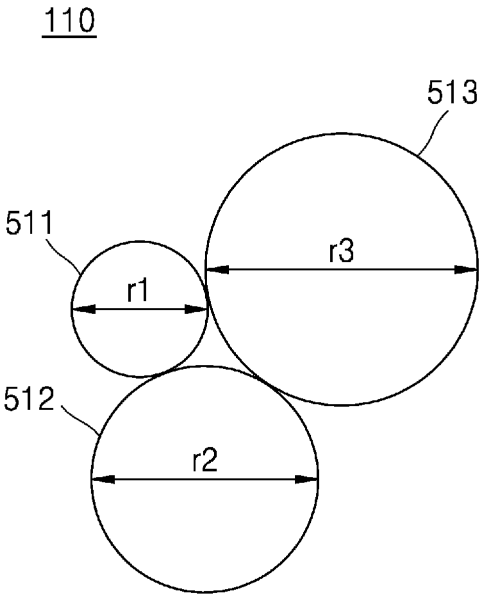
FIG. 6 is a diagram illustrating diameters of wires included in a susceptor.

FIG. 6 is a diagram illustrating diameters of the wires included in the susceptor.

FIG. 6 is a schematic cross-sectional view of the susceptor 110. Referring to FIG. 6, the plurality of wires 511, 512, 513 may have different diameters, respectively. For example, the first wire 511 may be set to have the first diameter r1, the second wire 512 may be set to have the second diameter r2 greater than the first diameter r1, and the third wire 513 may be set as the third diameter r3 greater than the second diameter r2.

As the plurality of wires 511, 512, 513 are set to have different diameters, the porosity may be improved. In addition, as the porosity increases, the capacity to conserve the aerosol generating material to be described later may also be improved.

Figure 7:
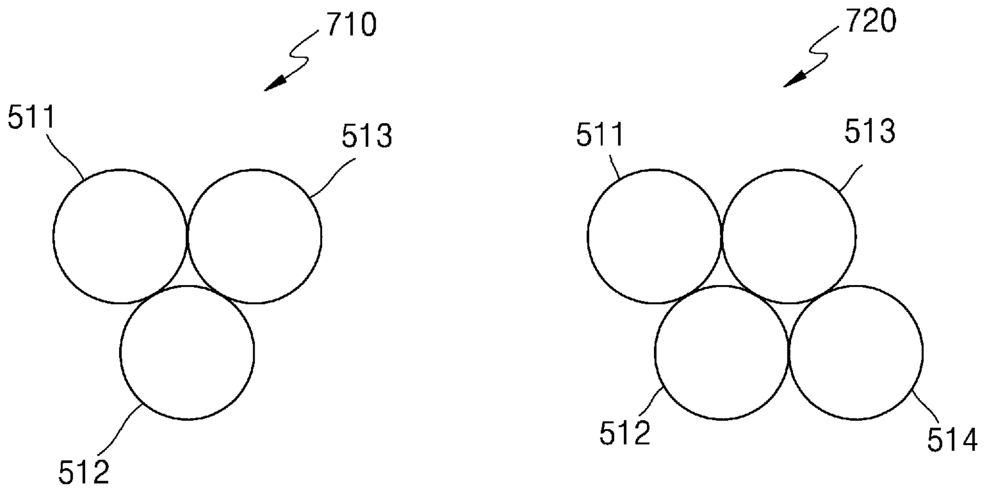
FIG. 7 is a diagram illustrating a method of removing a portion of a susceptor.

FIG. 7 is a diagram illustrating a method of removing a portion of the susceptor.

FIG. 7 schematically illustrates cross-sections 710 and 720 of the susceptor 110. Referring to FIG. 7, the susceptor 110 includes three wires, that is, the first wire 511, the second wire 512, and the third wire 513. Accordingly, in the cross-section 710 of the susceptor 110, the first wire 511, the second wire 512, and the third 513 may be seen. However, according to the unlimited supply method described above, at least four wires 511, 512, 513, 514 may be seen in a cross-section 720 of a portion of the susceptor 110.

According to the method of the present disclosure, for accuracy of control, a portion in which a preset number or more of wires are twisted together may be removed. For example, the preset number may include four, but is not limited thereto.

In an embodiment, the portion in which the preset number or more of wires are twisted together may be detected based on a weight per unit length. In another embodiment, the portion in which the preset number of more of wires are twisted together may be detected based on a change in capacity when a current is induced in the susceptor 110.

Figure 8:
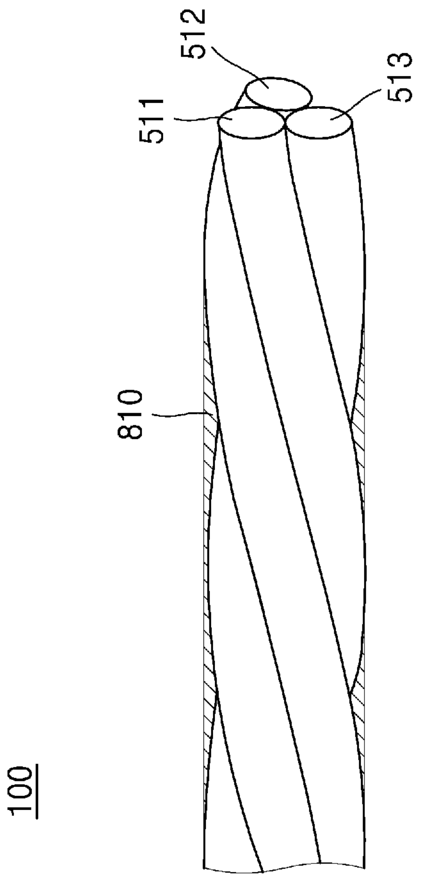
FIG. 8 is a diagram illustrating a method of impregnating a susceptor with an aerosol generating material.

FIG. 8 is a diagram illustrating a method of impregnating the susceptor with an aerosol generating material.

Referring to FIG. 8, the susceptor 110 may be manufactured in a form in which the first wire 511, the second wire 512, and the third wire 513 twisted together. The plurality of wires 511, 512, 513 may be impregnated with the aerosol generating material 810. In other words, the aerosol generating material 810 may penetrate among a plurality of wire strands. The aerosol generating material 810 may penetrate among the plurality of wire strands by being sprayed thereon.

The aerosol generating material may include undiluted slurry, glycerin, and the like. According to embodiments, the aerosol generating material 810 may include one component of water, solvents, ethanol, plant extracts, spices, flavorings, and vitamin mixtures, or a mixture of these components. The spices may include, but is not limited to, menthol, peppermint, spearmint oil, fruit-flavored ingredients, and the like. The flavorings may include components to provide various flavors or savors to the user. The vitamin mixtures may include, but is not limited to, a mixture of at least one of vitamin A, vitamin B, vitamin C, and vitamin E. In addition, the aerosol generating material 810 may include an aerosol forming agent such as glycerin and propylene glycol.

For example, the aerosol generating material 810 may include any weight ratio of glycerin and propylene glycol solution to which nicotine salts are added. The aerosol generating material 810 may also include two or more kinds of nicotine salt. Nicotine salts may be formed by adding suitable acids, including organic or inorganic acids, to nicotine. As a naturally generated nicotine or synthetic nicotine, nicotine may have a concentration of any suitable weight relative to a total solution weight of the aerosol generating material 810.

Acids for forming nicotine salt may be properly selected in consideration of blood nicotine absorption rate, an operation temperature of the aerosol generating device 100, flavors or savors, a solubility, and the like. For example, the acids for forming the nicotine salt may be one or a combination of at least two acids selected from among benzoic acid, lactic acid, salicylic acid, lauric acid, sorbic acid, levulic acid, pyruvic acid, formic acid, acetic acid, propionic acid, butyric acid, valeric acid, caproic acid, caprylic acid, capric acid, citric acid, myristic acid, palmitic acid, stearic acid, oleic acid, linoleic acid, linolenic acid, phenylacetic acid, tartaric acid, succinic acid, fumaric acid, gluconic acid, saccharic acid, malonic acid, or malic acid.

As the susceptor 110 has the form in which a plurality of wire strands are twisted together, the aerosol generating material 810 may penetrate among the wires of the susceptor 110, and accordingly, a heat-generating area may increase. In addition, due to the increase in the heat-generating area, a heat-generating efficiency may be significantly improved.

Figure 9:
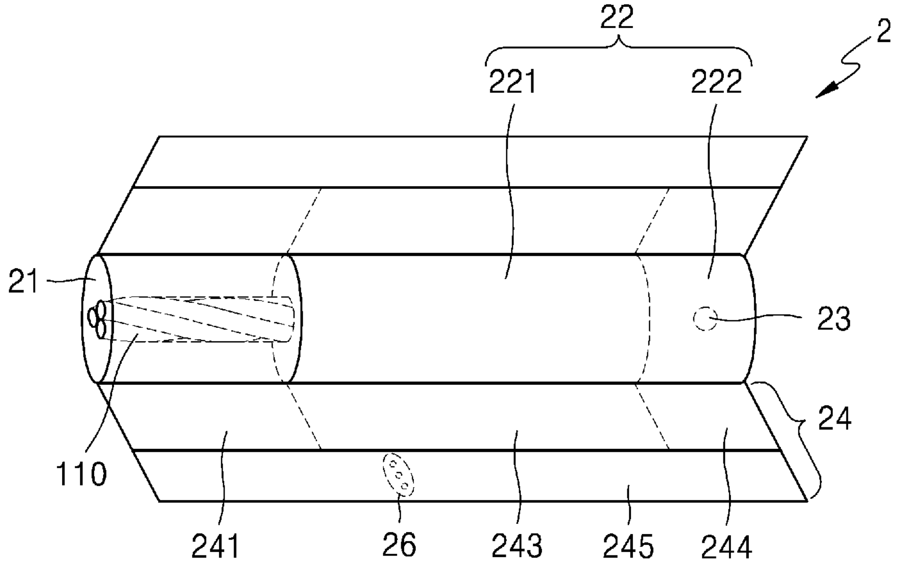
FIG. 9 is a diagram illustrating a cigarette according to an embodiment.

FIG. 9 is a diagram illustrating the cigarette according to an embodiment.

Referring to FIG. 9, a cigarette 2 includes a tobacco rod 21 and a filter rod 22. The cigarette 2 may correspond to the cigarette 200 shown in FIG. 4.

The tobacco rod 21 includes an aerosol generating material. For example, the aerosol generating material may include at least one of glycerin, propylene glycol, ethylene glycol, dipropylene glycol, diethylene glycol, triethylene glycol, tetraethylene glycol, and oleyl alcohol, but it is not limited thereto. In addition, the tobacco rod 21 may include other additional materials such as a flavoring agent, a wetting agent, and/or organic acid. In addition, a flavoring liquid such as menthol or moisturizer may be added to the tobacco rod 21 by being sprayed thereon.

The tobacco rod 21 may be variously manufactured. For example, the tobacco rod 21 may be manufactured into a sheet or strands. In addition, the tobacco rod 21 may be manufactured using pipe tobacco, which is formed of tiny bits cut from a tobacco sheet. In addition, the tobacco rod 21 may be surrounded by a heat-conducting material. For example, the heat-conducting material may be, but is not limited to, a metal foil such as aluminum foil. For example, the heat-conducting material surrounding the tobacco rod 21 may uniformly disperse the heat delivered to the tobacco rod 21, to thereby improve the conductivity of the heat applied to the tobacco rod, and by doing so, the flavor of the tobacco may be improved. Furthermore, the heat-conducting material surrounding the tobacco rod 21 may function as a susceptor heated by the induction heater.

The tobacco rod 21 may further include the susceptor 110 in addition to the heat-conducting material surrounding the outside of the tobacco rod 21.

The susceptor 110 may have a form in which a plurality of strands are twisted together. The susceptor 110 may be arranged at a center portion of the tobacco rod 21 and extend in a longitudinal direction of the tobacco rod 21. A length of the susceptor 110 may be set equal to or less than a length of the tobacco rod 21. Although FIG. 9 illustrates an example in which the length of the susceptor 110 is set equal to the length of the tobacco rod 21, according to embodiments, the length of the susceptor 110 may be set less than the length of the tobacco rod 21.

The susceptor 110 may be surrounded by the tobacco material, and the tobacco material may be processed into a cylindrical object. In addition, the tobacco material and the susceptor 110 may be cut together to form the tobacco rod 21.

The filter rod 22 may be arranged at an end of the tobacco rod 21. The filter rod 22 may include a plurality of segments. In an embodiment, the filter rod 22 may include a cooling segment 221 configured to cool the aerosol and a filter segment 222 configured to filter certain ingredients included in the aerosol. The cooling segment 221 may be arranged at an end of the tobacco rod 21, and the filter segment 222 may be arranged at an end of the cooling segment 221, at a portion in contact with the user's lips. Depending on necessity, the filter rod 22 may further include at least one segment configured to perform another function.

The filter segment 222 may include at least one capsule 23. Here, the capsule 23 may perform a function of generating a flavor, or may perform a function of generating an aerosol. For example, the capsule 23 may have a configuration in which a liquid containing a flavoring material is wrapped with a film. The capsule 23 may have a spherical or cylindrical shape, but is not limited thereto.

The filter rod 22 may include a cellulose acetate filter. A shape of the filter rod 22 is not limited. For example, the filter rod 22 may include a cylinder type rod, or may include a tube type rod including a hollow therein. In addition, the filter rod 22 may also include a recess type rod. When the filter rod 22 includes a plurality of segments, at least one of the plurality of segments may be manufactured in a shape different from those of others.

The cigarette 2 may be wrapped with at least one wrapper 24. At least one hole for introduction of external air or discharge of internal air may be formed in the wrapper 24. For example, the cigarette 2 may be wrapped with one wrapper 24. As another example, the cigarette 2 may be wrapped in layers with two or more wrappers 24. For example, the tobacco rod 21 may be wrapped with a first wrapper 241, and the filter rod 22 may be wrapped with wrappers 243 and 244. In addition, the entire portion of the cigarette 2 may be re-wrapped with a single wrapper 245. In a case where the filter rod 22 includes a plurality of segments, the segments may be respectively wrapped with the wrappers 243 and 244.

At least one perforation 26 may be formed in the wrappers 241, 243 and 244. The perforation may be formed in a region surrounding at least one of the tobacco rod 21 and the filter rod 22. Although FIG. 9 illustrates an example in which the perforation 26 is formed in a region surrounding the filter rod 22, according to embodiments, the perforation 26 may be formed in a region surrounding the tobacco rod 21.

Figure 10:
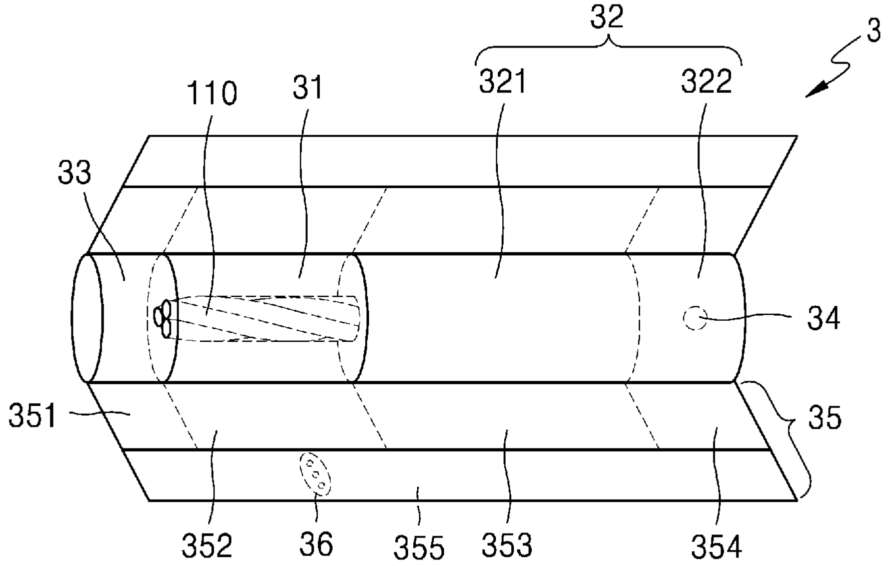
FIG. 10 is a diagram illustrating a cigarette according to another embodiment.

FIG. 10 is a diagram illustrating a cigarette according to another embodiment.

Referring to FIG. 10, a cigarette 3 may correspond to the cigarette 200 shown in FIG. 4. In addition, a tobacco rod 31, a filter rod 32, a cooling segment 321, a filter segment 322, and a capsule 34 shown in FIG. 10 may respectively correspond to the tobacco rod 21, the filter rod 22, the cooling segment 221, the filter segment 222, and the capsule 23 shown in FIG. 9. Therefore, repeated descriptions will not be given.

The cigarette 3 shown in FIG. 30 may further include a front-end plug 33. With reference to the tobacco rod 31, the front-end plug 33 may be at another end opposite to the filter rod 32. The front-end plug 33 may prevent the tobacco rod 31 from being displaced to the outside, and may prevent a liquefied aerosol from flowing from the tobacco rod 31 into the aerosol generating device 100 during smoking.

A diameter and a total length of the cigarette 3 may correspond to a diameter and a total length of the cigarette 2 shown in FIG. 9. For example, a length of the front-end plug 33 may be about 7 mm, a length of the tobacco rod 31 may be about 15 mm, a length of the cooling segment 321 may be about 12 mm, and a length of the filter segment 322 may be about 14 mm, but the lengths are not limited thereto.

The cigarette 3 may be wrapped with at least one wrapper 35. At least one hole for introduction of external air or discharge of internal air may be formed in the wrapper 35. For example, the front-end plug 33 may be wrapped with a first wrapper 351, the tobacco rod 31 may be wrapped with a second wrapper 352, the cooling segment 321 may be wrapped with a third wrapper 353, and the filter segment 322 may be wrapped with a fourth wrapper 354. In addition, the entire portion of the cigarette 3 may be re-wrapped with a fifth wrapper 355.

In addition, at least one perforation 36 may be formed in the fifth wrapper 355. The perforation 36 may be formed in a region surrounding at least one of the tobacco rod 31 and the filter rod 32. Although FIG. 10 illustrates an example in which the perforation 36 is formed in a region surrounding the tobacco rod 31, according to embodiments, the perforation 36 may be formed in a region surrounding the filter rod 32.

Figure 11:
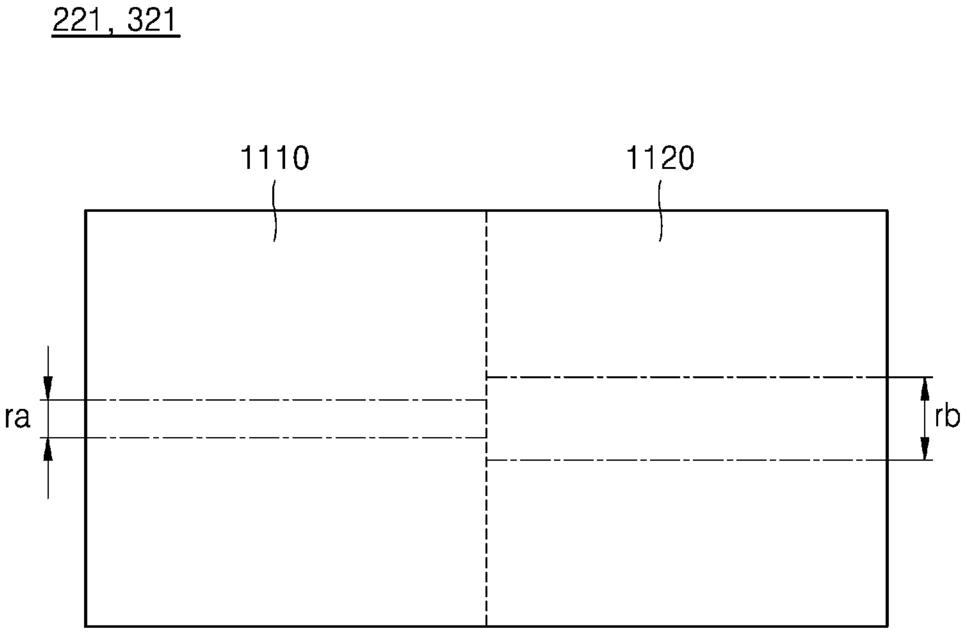
FIGS. 11 and 12 are diagrams illustrating a cooling segment included in a cigarette.
Figure 12:
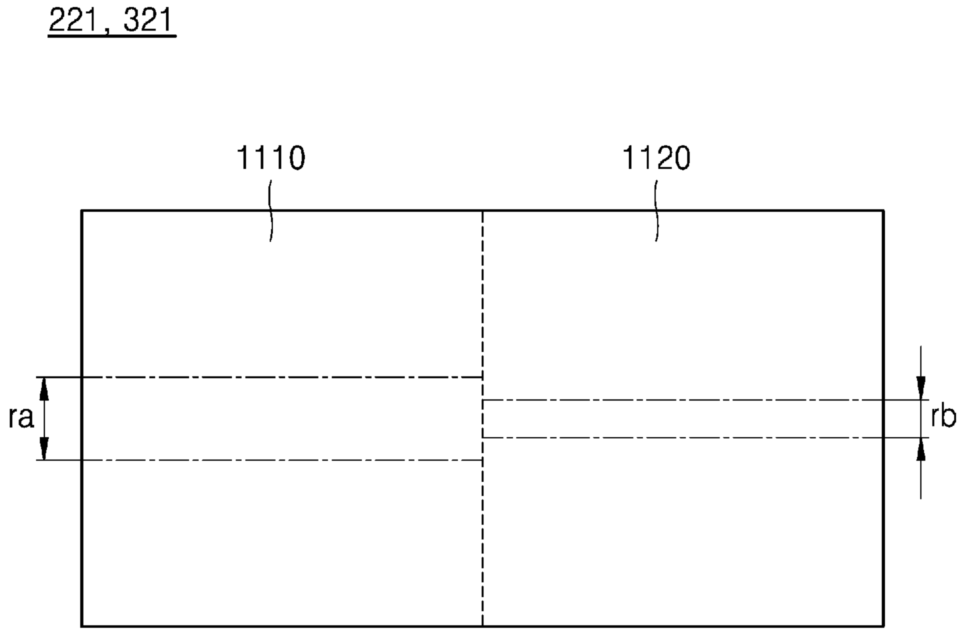

FIGS. 11 to 12 are diagrams illustrating the cooling segments included in the cigarettes.

FIGS. 11 to 12 respectively illustrate cross-sections of the cooling segments 221 and 321. Referring to FIGS. 11 to 12, the cooling segments 221 and 321 may include cooling members including a first cooling member 1110 and a second cooling member 1120, the cooling members having different diameters.

As shown in FIG. 11, the cooling segments 221 and 321 may include the first cooling member 1110 having a first diameter ra and the second cooling member 1120 having a second diameter rb greater than the first diameter ra. An end of the first cooling member 1110 may contact the tobacco rod 21, and an end of the second cooling member 1120 may contact the filter segments 222 and 322.

According to embodiments, as shown in FIG. 12, the first diameter ra may be greater than the second diameter rb. That is, the cooling segments 221 and 321 may include the first cooling member 1110 having the first diameter ra and the second cooling member 1120 having the second diameter rb that is less than the first diameter ra.

As the tobacco rods 21 and 31 include the susceptor 110, the first diameter ra may be less than a diameter of the susceptor 110. As such, the susceptor 110 may be prevented from being displaced from the tobacco rod 21.

According to a maximum temperature to which the susceptor 110 may be heated, the diameters of the cooling member 1110 and 1120 may be set as shown in FIG. 11 or 12.

Figure 13:
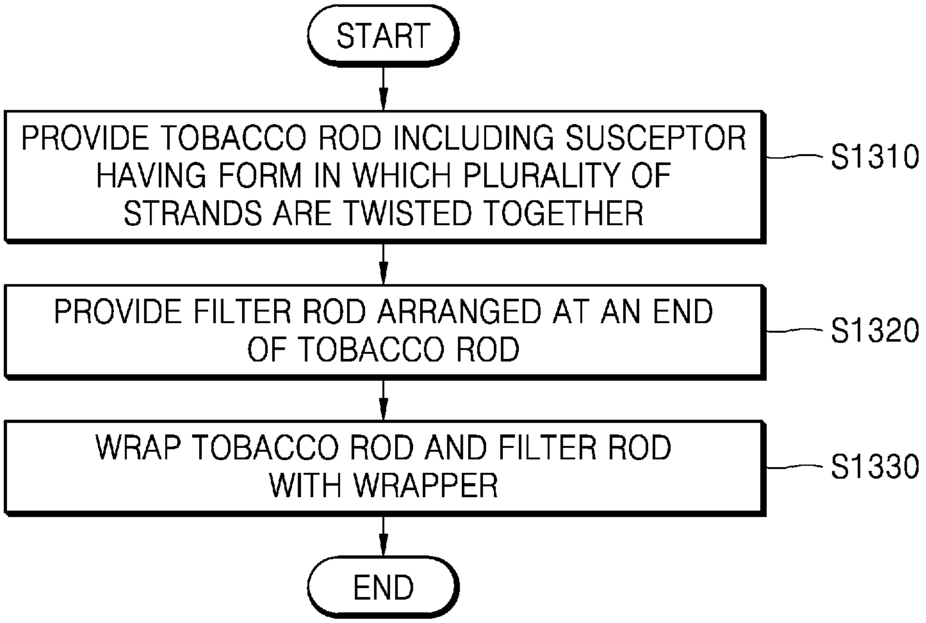
FIG. 13 is a flowchart illustrating a method of manufacturing an aerosol generating article according to an embodiment of the present disclosure.

FIG. 13 is a flowchart illustrating a method of manufacturing an aerosol generating article according to embodiments of the present disclosure.

Referring to FIG. 13, in S1310, the tobacco rods 21 and 31 including the susceptor 110 are provided, the susceptor having a form in which the plurality of strands are twisted together.

The susceptor 110 may include the plurality of wires including the plurality of wires 511, 512, 513, and may extend in a direction. For example, the direction may indicate a longitudinal direction of the cigarettes 2 and 3.

The susceptor 110 may include the first wire 511, the second wire 512, and the third wire 513. The first wire 511, the second wire 512, and the third wire 513 may have different lengths, respectively. For example, the first wire 511 may be set to have a first length, the second wire 512 may be set to have a second length greater than the first length, and the third wire 513 may be set to have a third length greater than the second length.

The susceptor 110 may include the plurality of strands, and may be manufactured in the form in which at least some of the plurality of strands are twisted together. In an embodiment, the susceptor 110 may be manufactured in the form in which the first wire 511, the second wire 512, and the third wire 513 are twisted together. In other words, the first wire 511, the second wire 512, and the third wire 513 may be twisted together. Accordingly, the first wire 511, the second wire 512, and the third wire 513 may extend with inclination with respect to the longitudinal direction. Here, the longitudinal direction may indicate the longitudinal direction of the cigarette 200 and/or the aerosol generating device 100.

The first wire 511, the second wire 512, and the third wire 513 may be twisted in the preset direction with respect to the longitudinal direction. For example, the first wire 511, the second wire 512, and the third wire 513 may be twisted in a clockwise direction. As another example, the first wire 511, the second wire 512, and the third wire 513 may twisted in a counter-clockwise direction.

As the first wire 511, the second wire 512, and the third wire 513 respectively have different lengths, at a certain time point, one of the wires is no more twisted with other two wires. In the method of the present disclosure, a new wire is added in consideration of the preset time point, and the susceptor 110 may be extended.

More particularly, the new wire 514 may be provided at a time point at which the first wire 511 is no longer twisted with the second wire 512 and the third wire 513. For example, the preset time point may be set based on a time point at which a length of an untwisted portion is less than a reference length. The reference length may be 1 cm to 3 cm, but is not limited thereto. The new wire 514 may be twisted with the second wire 512 and the third wire 513. Accordingly, the susceptor 110 may extend in a direction. A length of the new wire 514 may be set based on a length of a longest wire from among the first wire 511, the second wire 512, and the third wire 513. For example, the length of the new wire 514 may be greater than the length of the third wire 513.

The first wire 511, the second wire 512, and the third wire 513 may have different diameters, respectively. For example, the first wire 511 may have the first diameter r1, the second wire 512 may have the second diameter r2 greater than the first diameter r1, and the third wire 513 may have the third diameter r3 greater than the second diameter r2.

The first wire 511, the second wire 512, and the third wire 513 may be impregnated with the aerosol generating material 810. In other words, the aerosol generating material 810 may penetrate among the plurality of wire strands. The aerosol generating material 810 may penetrate among the plurality of wire strands by being sprayed thereon.

According to the method of the present disclosure, for accuracy of control, a portion in which a preset number or more of wires are twisted together may be removed. For example, the preset number may include four, but is not limited thereto.

In an embodiment, the portion in which the preset number or more of wires are twisted together may be detected based on a weight per unit length. In another embodiment, the portion in which the preset number of more of wires are twisted together may be detected based on a change in capacity when a current is induced in the susceptor 110.

The susceptor 110 may be surrounded by the tobacco material, and the tobacco material may be processed into a cylindrical object. In addition, the tobacco material and the susceptor 110 may be cut together to form the tobacco rod 21.

In S1320, the filter rods 22 and 32 respectively arranged at an end of the tobacco rods 21 and 31 may be provided.

In an embodiment, the filter rod 22 and 32 may include the cooling segments 221 and 321 configured to cool the aerosol and the filter segments 222 and 322 configured to filter certain components included in the aerosol.

The cooling segments 221 and 321 may include the first cooling member 1110, which allows the aerosol to pass and has the first diameter ra, and the second cooling member 1120 having the second diameter rb different from the first diameter ra.

According to embodiments, before S1310, the method may further include providing the front-end plug 33 arranged at another end of the tobacco rods 21 and 31. The front-end plug 33 may prevent the tobacco rod 31 from being displaced to the outside, and may prevent a liquefied aerosol from flowing from the tobacco rod 31 into the aerosol generating device 100 during smoking.

In S1330, the tobacco rod 21 and the filter rod 22 may be wrapped with the wrapper 24, and the tobacco rod 31 and the filter rod 32 may be wrapped with the wrapper 35.

The perforation 26 may be formed in a region surrounding at least one of the tobacco rod 21 and the filter rod 22, and the perforation 36 may be formed in a region surrounding at least one of the tobacco rod 31 and the filter rod 32.

Those of ordinary skill in the art related to the present embodiments may understand that various changes in forms and details may be made therein without departing from the scope of the characteristics described above. The disclosed methods should be considered in a descriptive sense only and not for purpose of limitation. The scope of the present disclosure is disclosed in the appended claims rather than the descriptions, and all differences within the scope equivalent to those described in the claims will be construed as being included in the scope of the present disclosure.

What is claimed is:

1. A method of manufacturing an aerosol generating article, the method comprising:

providing a tobacco rod comprising a susceptor having a form in which a plurality of wires, comprising a first wire, a second wire, and a third wire, are twisted together, by:

providing the susceptor extending in a direction, by:

providing the plurality of wires in which the first wire has a different length than the second wire, the second wire has a different length than the third wire, and the first wire has a different length than the third wire;

forming the plurality of wires into the form twisted in a preset direction; and extending, by adding a new wire, the form twisted in the preset direction;

surrounding the susceptor with a tobacco material and processing the tobacco material into a cylindrical shape; and cutting the cylindrical shape;

providing a filter rod arranged at an end of the tobacco rod; and wrapping the tobacco rod and the filter rod with a wrapper.

2. The method of claim 1, wherein the plurality of wires have different diameters from one another.

3. The method of claim 1, wherein the providing the susceptor comprises:

impregnating the susceptor having the form in which the plurality of wires are twisted, with an aerosol generating material.

4. The method of claim 1, wherein the cutting the cylindrical shape comprises:

removing a portion in which a preset number or more of wires are twisted together.

5. The method of claim 1, wherein the providing the filter rod comprises:

providing a cooling segment configured to cool an aerosol; and providing a filter segment arranged at an end of the cooling segment and configured to filter certain materials included in the aerosol.

6. The method of claim 5, wherein the providing the cooling segment comprises:

providing a first cooling member configured to allow the aerosol to pass therethrough and having a first diameter; and providing a second cooling member configured to allow the aerosol to pass therethrough and having a second diameter different from the first diameter.

7. The method of claim 1, further comprising:

before the providing of the tobacco rod, providing a front-end plug arranged at another end of the tobacco rod.

8. The method of claim 1, wherein the wrapping with the wrapper comprises:

forming a perforation in a region of the wrapper surrounding at least one of the tobacco rod and the filter rod.

* * * * *